Feb. 2, 1943.  W. P. HUNSDORF  2,309,904
ELECTRIC MOTOR
Filed April 2, 1940
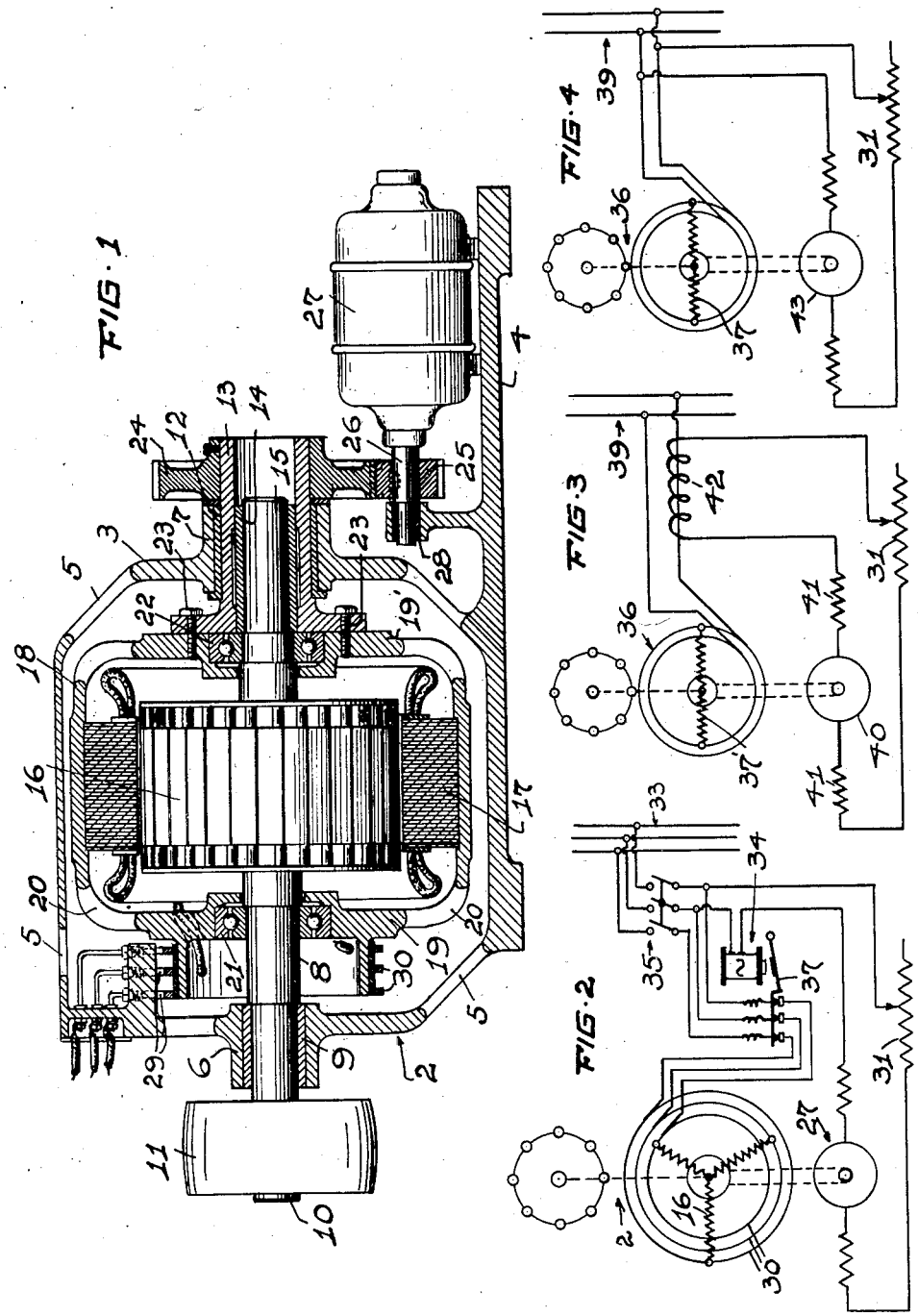
INVENTOR.
WILLIAM P. HUNSDORF
BY Gustav A. Wolff
ATTORNEY.

Patented Feb. 2, 1943

2,309,904

UNITED STATES PATENT OFFICE 2,309,904

ELECTRIC MOTOR

William P. Hunsdorf, Cleveland, Ohio

Application April 2, 1940, Serial No. 327,435

2 Claims. (Cl. 172—274)

This invention relates to alternating current motors with rotary armature and rotary field members and its general object is to provide for such motors simplified starting and low line surge during starting and running operations. Such general object of the invention is attained by the provision of positive, speed controlled driving means directly coupled with one of the rotary members of these motors in such a fashion that the one rotary member is rotated in a direction opposite to the rotation of the other, load carrying rotary member and may readily be rotated with a speed equal to the rotary speed for which the motor has been designed. Such an arrangement which effects starting of a motor with extremely low line surge, as the driving means for the one rotary member rotate said member without load, permits of a perfect control of the speed of the load carrying rotary member by increasing or decreasing the rotary speed of the driving means without any substantial change in the relative speed of the two rotary members with respect to each other and insures slow running of the load carrying rotary member with a high driving torque and without excessive undesirable line surge during changes in the rotary speed of the load carrying member and changes in the load carried by said member. The driving means for the driven rotary member of a motor of the type referred to is preferably a small electric motor of any practical construction and design, which motor is either directly connected to the line or connected in series or parallel to the circuit of the motor. In some cases it might be advantageous to use mechanically actuated variable speed devices to effect the desired rotary speed ratio between the rotary members of the motor.

The invention which is applicable to synchronous and asynchronous motors is especially effective for single-phase induction motors which are not self-starting, as in these motors the field must be regarded reciprocating when the armature is at rest. The invention is also applicable for large motors such as used in mills, elevators, etc., to reduce the high rate current measured on demand meters and the power factor and permits of substantial overload of these motors without excessive line surges.

The general principle of the invention will more clearly be understood from the following specification and drawing showing an exemplified form of a motor built in accordance with the invention and a plurality of diagrams of the secondary motor with several individual motor circuits, and is precisely defined in the appended claims.

In the drawing:

Fig. 1 is a longitudinal sectional view through a three-phase induction motor with a rotary field member, a rotary squirrel cage armature and a secondary motor mechanically coupled with the rotary field member.

Fig. 2 is a diagram showing the circuit of the motor of Fig. 1 and the circuit of the secondary motor rotating the field member, the secondary motor, a series repulsion motor, being directly coupled with the net independent of the circuit of the three-phase induction motor.

Fig. 3 is a diagram showing the circuit of a single-phase induction motor embodying a rotary field and a rotary squirrel cage armature, the rotary field being mechanically coupled with a series repulsion motor which by means of a series transformer is electrically coupled with the rotary field of the single-phase induction motor; and Fig. 4 is a diagram similar to that shown in Fig. 3 with the exception that the series repulsion motor is shunted with respect to the rotary field of the single-phase induction motor.

Referring now to the exemplified form of the invention illustrated in the drawing, reference numeral 2 denotes a three-phase induction motor embodying a casing 3 preferably including a base 4, which casing provides enclosing and supporting means for the rotating parts of the motor. Casing 3 which includes ventilating openings 5 embodies at its opposite ends bearings 6 and 7 which support armature carrying shaft 8. Bearing 6 mounts a bearing sleeve 9 through which extends end 10 of shaft 8, which end carries a pulley 11. Bearing 7 is larger in diameter than bearing 6 and carries a bearing sleeve 12 having rotatably extended therethrough a hollow stud shaft 13 which mounts in its hollow part a bearing sleeve 14 for the other end 15 of shaft 8. Shaft 8 which is thus freely rotatably mounted permits any desired rotation of a squirrel cage armature 16 carried thereby. This squirrel cage armature is surmounted by a field 17 concentrically arranged with respect to armature 16 and rotatably mounted in casing 3, as will hereinafter be described. Field 17 is arranged in a substantially cylindrical housing 18, the opposite side walls 19 and 19' of which are provided with ventilating openings 20. These side walls rotatably support housing 18 on shaft 8 by means of roller bearings 21, 22, and side wall 19' is attached to stud shaft 13, flanged at its inner end and attached to said side wall by set screws 23. Stud shaft 13 has attached to its outer end a gear 24 which meshes with a gear 25 on shaft 26 of a series motor 27 and preferably shaft 26 is steadied by a bearing 28 on base 4 of casing 3.

Motor 27 by means of gears 24 and 25 effects rotation of field 17 in a direction opposite to the rotation of armature 16 when current is fed to the field of the motor by means of brushes 29 and rings 30. This arrangement permits exact control of the rotary speed of said armature. Thus, when motor 27 is running at full speed, armature 16 is practically at a standstill and when the speed of motor 27 is reduced by actuation of resistance 31 (see Fig. 2), armature 16 will begin to revolve at such a speed that the relative movement between armature 16 and field 17 is equal to the rotary speed for which motor 2 has been designed. Series motor 27 may also be used to start the three-phase induction motor so as to avoid excessive line surge during starting operations. In such a case it is desirable that starting of motor 2 is effected prior to feeding of current to motor 2. Such an arrangement is diagrammatically shown in Fig. 2 in which the three-phase induction motor 2 has its rings 30 electrically coupled with net 33 by means of an A. C. relay switch 34 and a main switch 35, and in which the series motor 27 is shunted with respect to motor 2 in such a manner that relay switch 34 controls the current fed into the field 17 of said motor 2. When the main switch 35 is closed, current flows from the net to and through the series relay coil of relay switch 34, the field windings of motor 27 and resistance 31 to the net and vice versa. Such current flow actuates relay switch 34 and effects opening of said switch so that no current flows from line 33 to the field 17 of motor 2. When the rotary speed of field 17 increases, the current drawn by motor 27 decreases so that the decrease in current flowing through the series relay coil of relay switch 34 effects release of switch arm 37 and therewith closing of the field circuit for motor 2. Such action takes place with little or no load on motor 2 and therefore undesirable line surge cannot occur. The speed of motor 27 governed by adjustable resistance 31 controls the rotary speed of armature 16. Motor 27 must of course be powerful enough to counteract forces tending to rotate the field in an opposite direction when a heavy load is carried by armature 16. This may be facilitated by electing a proper gear ratio between gears 24 and 25 as indicated in Fig. 1 of the drawing or by any other suitable method known in the art.

The diagram of Fig. 3 shows a single-phase induction motor 36 with a rotary field 37' and a rotary squirrel cage armature 36. The field 37', which is directly electrically connected with the net 39, is mechanically coupled with a series motor 40, and the field 41 of motor 40 is coupled by means of a series transformer 42 with the conduit which coupled field 37' with the net 39. This electric hook-up will give the single-phase motor 36 some of the characteristics of a D. C. series motor.

The diagram of Fig. 4 shows an arrangement similar to that shown in Fig. 3 with the exception that the series motor 43 is shunted from the conduits connecting the field 37 with the net 39. Such an arrangement impresses upon the single-phase motor 36 some of the characteristics of a D. C. shunt motor. In both diagrams of Fig. 3 and Fig. 4 the series motors 40 and 43 are speed controlled by a resistance 31 in a manner similar to that disclosed in Fig. 2.

Having thus described my invention, what I claim is:

1. The combination of an alternating current source of electric energy and an electric motor having a revolving field member and a revolving armature member with a second, speed controlled electric motor mechanically coupled with one of the members of said first motor to effect speed controlled rotation of said one member, the fields of said two motors being arranged parallel to each other and only one of said fields being directly coupled with said source of electric energy so that said second motor rotates said one rotary member in a direction opposite to the direction of rotation of the other rotary member, and electrically controlled automatic switching means arranged in series with the field of the second electric motor for cutting off the current supply to said first electric motor until its driven rotary member is rotated by said second motor at a speed approximately equal to the rotary speed for which said first motor has been designed.

2. The combination of an alternating current source of electric energy, an electric motor having a revolving field member and a revolving armature member with a second speed controlled electric motor mechanically coupled with one of said members to effect speed controlled rotation of said one member, the fields of said two motors being arranged parallel to each other and only one of said fields being directly coupled with said source of electric energy so that said second motor rotates said one rotary member in a direction opposite to the direction of rotation of the other rotary member, and a solenoid switch connected in series with the field of the second motor, said solenoid switch being adapted to automatically cut off the current for said first electric motor when current is supplied to said second motor until said last motor has effected rotation of the driven rotary member of said first motor at a speed approximately equal to the rotary speed for which said first motor has been designed.

WILLIAM P. HUNSDORF